April 15, 1930.　　E. S. MacPHERSON　　1,754,632
STEERING GEAR MECHANISM
Filed March 14, 1927　　2 Sheets-Sheet 1
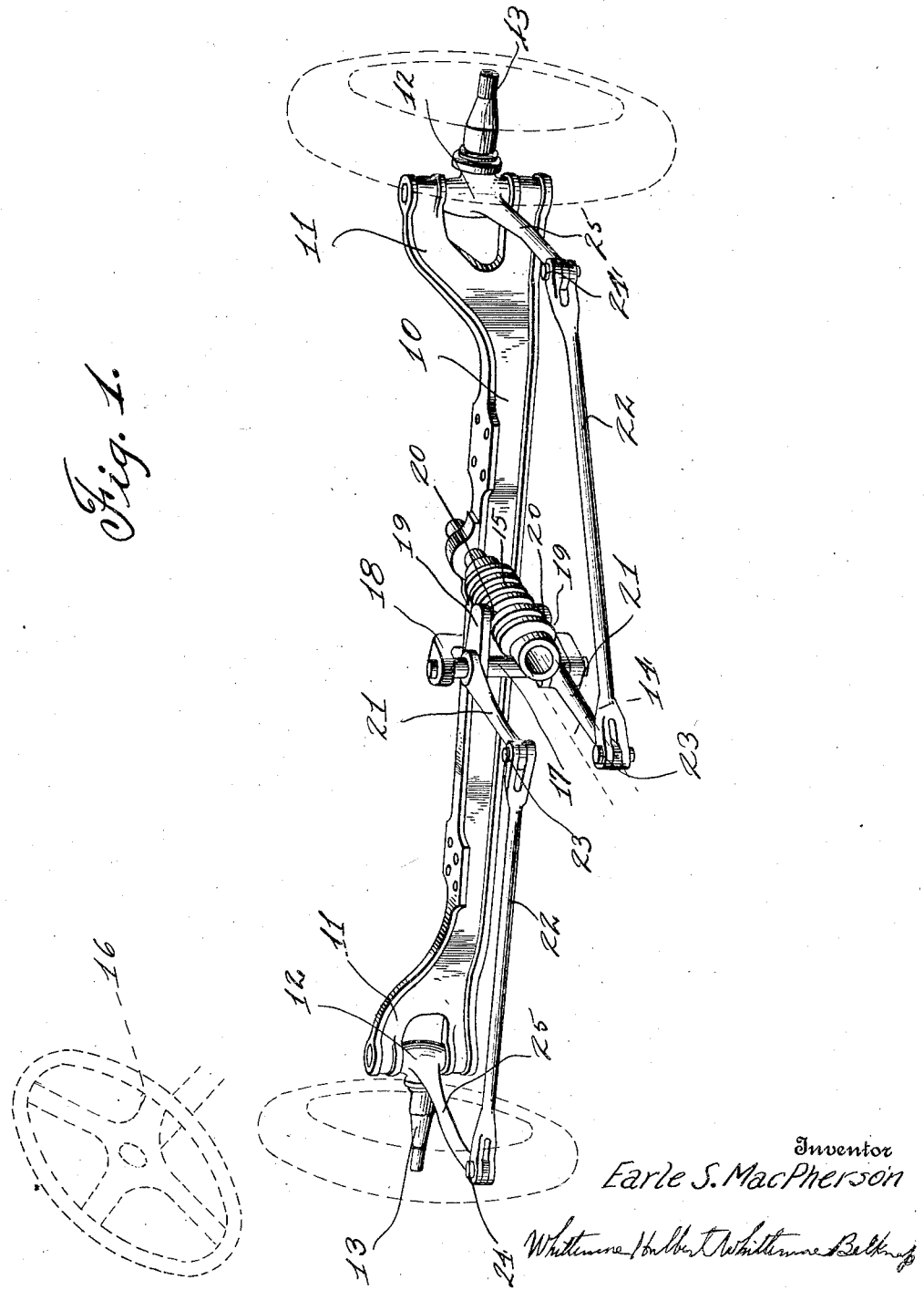

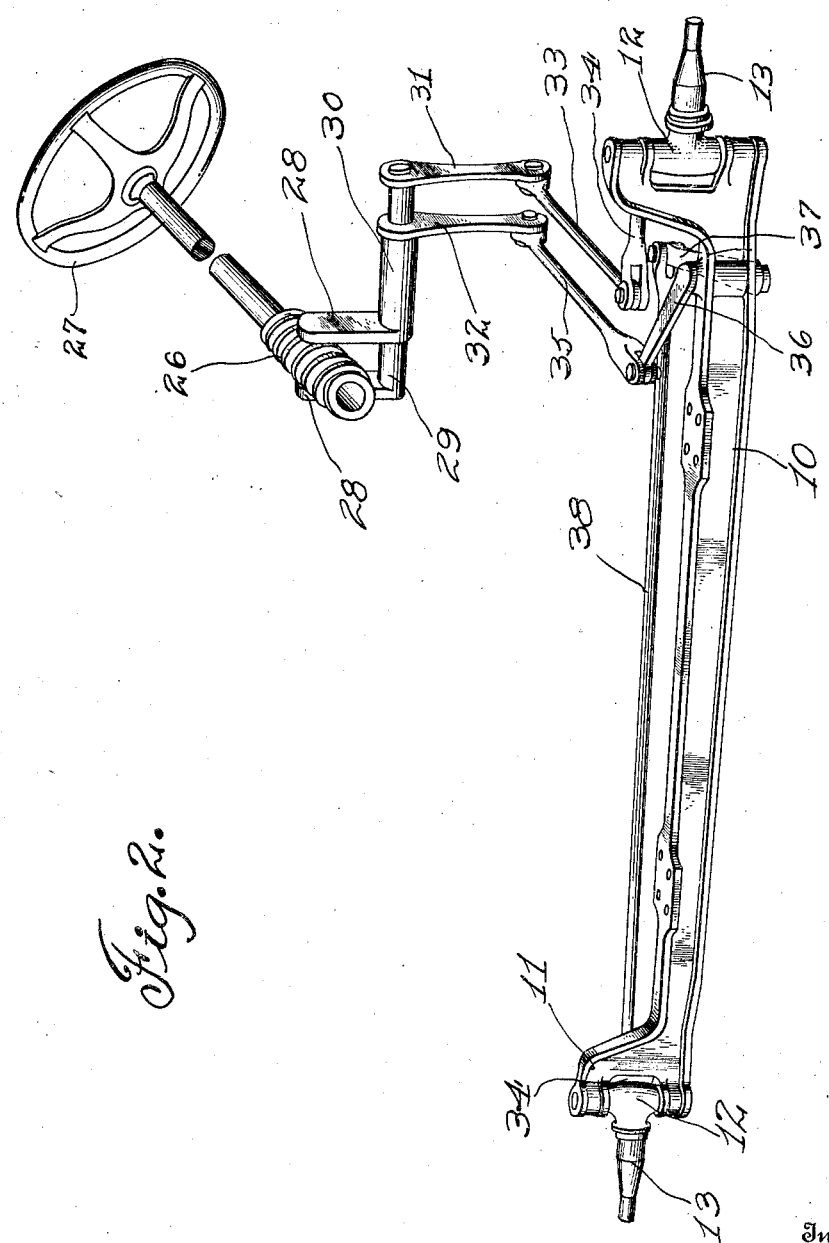

Patented Apr. 15, 1930

1,754,632

UNITED STATES PATENT OFFICE

EARLE S. MacPHERSON, OF DETROIT, MICHIGAN, ASSIGNOR TO HUPP MOTOR CAR CORPORATION, OF DETROIT, MICHIGAN, A CORPORATION OF VIRGINIA

STEERING-GEAR MECHANISM

Application filed March 14, 1927. Serial No. 175,360.

This invention relates to a steering gear mechanism and more especially to a steering mechanism for use in connection with motor vehicles and the like.

One of the principal objects of this inventiontion is to provide simple but effective means for eliminating the shimmying of the wheels and in accordance with the present invention this object is accomplished by an arrangement which acts to destroy synchronism between the steered ground engaging wheels.

To obtain the above mentioned advantages it is proposed to provide each of the pair of steered road wheels with a driven actuating member entirely independent of the other and to provide means actuated by the steering wheel having a driving connection with these two independent actuating means. Inasmuch as the connection between the driving and driven members includes a reduction gearing and this reduction gearing constitutes the sole connection between the driven members, it is impossible for the wiggle or shimmying of one of the steered road wheels to be transmitted to the other because of the friction and irreversibility of the reduction gearing. Furthermore the motion of one of the ground engaging wheels which might occur by reason of the clearance which exists between its driven member and the driving member of the steering mechanism, cannot be transmitted to the other ground engaging wheel without acting through the irreversible reduction gearing and as a consequence the transmission of such movements is so adequately resisted as to prevent its occurrence.

Other objects and advantages and the novel details of construction of two embodiments of the invention will be made more apparent as this description proceeds, especially when considered in connection with the accompanying drawings, wherein:

Figure 1 is a perspective view of a steering gear constructed in accordance with this invention, and Figure 2 is a similar view of a slightly modified form of construction.

Referring now more particularly to Figure 1 of the drawings it will be noted that there is illustrated a front axle 10 within the forked ends 11 of which steering knuckles 12 are mounted, which knuckles carry the usual wheel spindles 13 upon which steered ground engaging wheels (indicated by dotted lines) are adapted to be mounted.

The reference character 14 indicates a worm shaft provided with a worm 15. This shaft constitutes the driving member and is adapted to be rotated, during the steering of the vehicle, by means of a steering wheel 16. Pivotally mounted upon a shaft 17, which is vertically supported by means of a bracket 18, is a pair of driven members 19, entirely independent of one another. These driven members 19 are provided with lateral projections 20 which engage the worm 15 on diametrically opposed sides thereof so that the members 19 are oscillated upon a rotation of worm 15. Connected to each driven member 19, for oscillation therewith about shaft 17, is an arm 21, each of which is connected to a steering knuckle 12 by means of a rod 22 pivotally connected as at 23 to the said arm, and as at 24 to a steering arm 25 projecting from the steering knuckle. It will be observed that the members 19 and 21 constitute bell cranks by which motion may be transmitted from the worm 15 to the links 22 for operating the steering knuckles.

In the construction shown in Figure 2 the worm 26, which constitutes the driven member, is rotated by means of steering wheel 27 and actuates a pair of independent driven members 28 similar in construction to the previously described driven members 19. One of these members is carried by shaft 29 which extends loosely through a sleeve 30 which carries the other member 28. Levers 31 and 32 are secured respectively to the shaft 29 and sleeve 30. Lever 31 is connected by means of a rod 33 to the steering arm 34 projecting from the steering knuckle 12. The other lever 32 is connected by a rod 35 to a lever 36 pivotally mounted upon the axle 10 and connected through its pivot to a second lever 37 which in turn is connected by a connecting rod 38 to the steering arm 34 of the other steering knuckle.

In both of the herein described forms of the invention it will be noted that a rotation of the driven member, that is, the worm 15 in Figure 1 and the worm 26 in Figure 2 causes an oscillation of the driven members which are the actuating means for the two steered ground engaging wheels whereupon these wheels may be moved, as customary, during steering. However, it will be noted that in both forms of the invention, each of the steered ground engaging wheels, has an actuating means separate from and independent of the actuating means of the other steered wheel and that the sole connection between the actuating mean of the pair of steered wheels is the driven member, herein illustrated as a worm, actuated by the steering wheel. Furthermore the driving and driven elements constitute a reduction gearing which is inherently irreversible. As a consequence of this construction one of the ground engaging wheels cannot transmit motion to the other even to the extent of the clearance of back lash which exists between the driven members and the worm, without rotating the worm, which is impossible, or practically so. Thus the clearance which exists between each of the driven members and the worm, which may be the result of the original design or of wear occasioned thereto and which will permit either or both of the wheels to wiggle or shimmy through an angle depending upon the extent of such clearance, cannot be transmitted directly to the other ground engaging wheel. Therefore, all direct connection between the steered and ground engaging wheels is eliminated and a more efficient and satisfactory steering gear mechanism produced.

It should be understood that the two forms of the invention illustrated and described herein, somewhat in detail are for the purpose of illustration only and should not be construed as in anywise limiting the invention, reservation being made to make such changes in any of the essential, and all of the non-essential details as may come within the purview of the accompanying claims.

What I claim as my invention is:—

1. In a steering mechanism, the combination with an axle having steering knuckles adjacent the ends thereof, of a shaft supported by said axle intermediate the ends thereof and extending transversely of the same, bell crank levers mounted upon said shaft, links establishing a connection between one arm of said levers and the knuckles aforesaid, and a driving member connected to the other arm of said bell crank levers for actuating the same to effect an operation of said steering knuckles.

2. In a steering mechanism, the combination with an axle having steering knuckles adjacent the ends thereof, of a shaft supported by said axle intermediate the ends thereof and extending transversely of the same, a pair of levers journalled intermediate the ends thereof upon said shaft, links establishing a connection between one end of said levers and the knuckles aforesaid, and a driving member journalled upon said axle extending between and connected to the opposite ends of said levers for actuating the same to effect an operation of said steering knuckles.

3. In a steering mechanism, the combination with an axle having steering knuckles adjacent the ends thereof, of a rotatable worm member journalled upon said axle intermediate the ends thereof and extending rearwardly therefrom, a shaft also journalled upon said axle and extending transversely of said rotatable screw adjacent thereto, a pair of spaced levers mounted upon said shaft intermediate the ends thereof, links connecting one end of said levers to the steering knuckles, and means upon the opposite ends of said levers engageable with opposite sides of said screw to be actuated by the latter.

In testimony whereof I affix my signature.

EARLE S. MacPHERSON.